Feb. 2, 1960 J. V. PETRIELLO 2,923,651
METAL-PLASTIC FILM LAMINATES
Filed Dec. 15, 1954
FIG. 1.
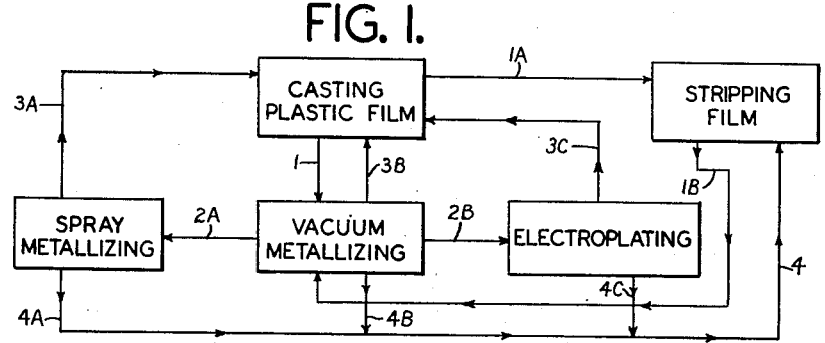
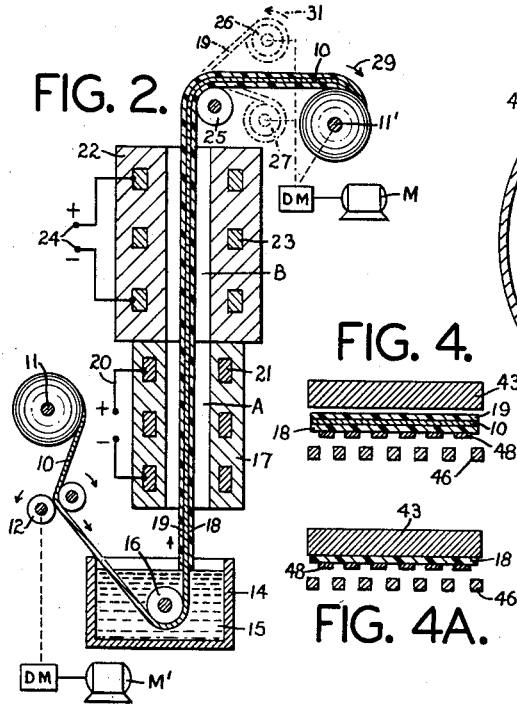
FIG. 2.
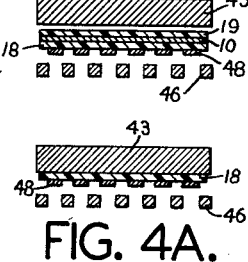
FIG. 4.
FIG. 4A.
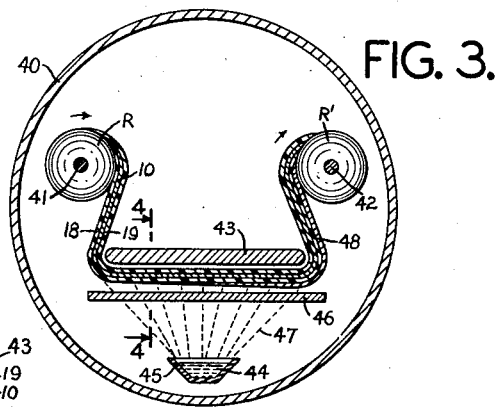
FIG. 3.
FIG. 5.
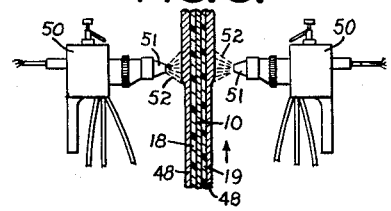
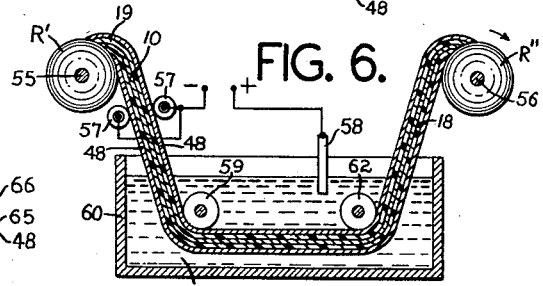
FIG. 6.
FIG. 7.
FIG. 8.
FIG. 9.
FIG. 10.
FIG. 12.
FIG. 11.
INVENTOR
JOHN V. PETRIELLO.
BY
*Samuel J Stree*
ATTORNEY.

2,923,651

METAL-PLASTIC FILM LAMINATES

John V. Petriello, Queens Village, N.Y.

Application December 15, 1954, Serial No. 475,343

3 Claims. (Cl. 154—80)

This invention relates to the art of laminated structures and particularly concerns novel laminates consisting of extremely thin layers of metal on organic plastic film. The invention further relates to method and apparatus for constructing such laminates.

The invention has particular utility for fabricating capacitors employed in diverse electrical applications. The capacitor structures made possible by the present invention have higher thermal stability than has hitherto been attainable in prior capacitors constructed of flammable and heat deformable organic dielectrics.

An acceptable capacitor must contain a dielectric whose electric strength is high so as to maintain at a minimum the thickness between the metal components serving as electrodes. Furthermore, the dielectric loss of the dielectric must be low to reduce internal heating and its dielectric constant should be high to reduce the area for a given capacitance. Although liquid dielectrics of high dielectric would appear suitable, they are undesirable because of (1) difficulty in mechanically spacing the metal electrodes and (2) the hazard of failure by possible presence of conducting particles in the liquid. A laminar solid is preferable, an example of which is mica used especially because of its low loss factor. However, it too, has a disadvantage of entrapping air pockets during assembling and therefore, for high voltage applications, impregnation by dielectric liquids is necessary. Moreover, mica is not used extensively for large capacitance because of the cost and difficulty in obtaining thin sheets or built-up plates of satisfactory uniformity.

The common capacitors used for power-factor correction or electronic circuit filtering, frequency by-passing, D.-C. blocking, antihunt and stabilizing circuits, circuit tuning, timing and voltage doubling, triggering in impulse-circuits include thin oil-impregnated paper as the dielectric. However, this type of dielectric has shown marked limitations in working temperatures, permissible voltage stress, and oxidative stability which are seriously impaired in prolonged service thereby affecting in time the rated capacitance. These deficiencies ultimately lead to deterioration of the capacitor thus requiring frequent and often costly replacement. Dielectric liquids such as paraffin oil are particularly susceptible to crystallization at low temperature services thus forming voids where corona may develop. This crystallization can be overcome by the use of various chlorinated hydrocarbons, aliphatic and aromatic notably biphenyl compounds. However, these chlorinated compounds are polar in nature, exhibiting dielectric absorption and anomalous dispersion below room temperature where the dielectric constant is no longer uniform and actually increases. This variance renders the chlorinated dielectrics unsuited for capacitor motors in devices used in intermittent service where the initial properties are important as, for example, in starting at low temperatures. Recently, polysiloxane oils have been used as dielectrics affording a somewhat higher temperature range in capacitor performance compared to paraffin oils and chlorinated hydrocarbons. However, these polysiloxane oils ultimately resinify if exposed to temperatures higher than 200° C., and being oils require a supporting matrix like paper which itself is degraded on continued exposure to these temperatures.

More recently, new types of polymeric compounds having excellent stability and a relatively high temperature coupled with chemical inertness, especially resistance to oxidation, have been developed from fluorinated ethylene, notably the polyhaloethylenes: tetrafluoroethylene and chlorotrifluoroethylene. As a member of this type of fluorine-containing polymer, a unique dielectric having most of the attributes necessary to overcome the above shortcomings has been found in polytetrafluoroethylene. However, this dielectric applied as a separated layer owing to its unique chemical inertness and lack of adhesion to any surface likewise is susceptible to introduction of voids or statically-occluded particles during lamination even under most careful or skilled placement techniques. The voids and/or occluded particles are frequently sources of pinholes that cause dielectric breakdown.

A principal object of this invention, therefore, is to provide a structure comprising a lamination of a thin metal conductor and a thin dielectric of polytetrahaloethylenes. A further object is to provide a composite structure in which the component metal conductor and a polyhaloethylene dielectric are fused into a physically inseparable laminate to provide a capacitor of substantially uniform dielectric properties over a wide range of temperatures and frequencies. A further object is to provide a process for laminating thin polyhaloethylene layers with thin metal layers.

A further object is to provide a novel apparatus for applying thin metal layers to polyhaloethylene films.

Other and further objects and advantages of the invention will become apparent from the following description taken together with the drawing wherein:

Fig. 1 is a flow chart in block diagram form illustrating various methods for practicing the invention.

Fig. 2 is an elevational view of a single stage deposition apparatus for casting film on a moving belt.

Fig. 3 shows in vertical section an apparatus for evaporating a metal layer in selective strips on a film surface.

Fig. 4 is a sectional view taken on lines 4—4 of Fig. 3.

Fig. 4A shows a modification of Fig. 4.

Fig. 5 shows apparatus for building up the thickness of a metal layer.

Fig. 6 shows another apparatus for building up the thickness of a metal layer.

Figs. 7 to 12 show laminated structures as produced in accordance with the invention.

In accordance with the invention, a metal layer is deposited over a cast substrate film of polytetrafluoroethylene by a high vacuum evaporation process. Additional alternate layers of metallized surface and polytetrafluoroethylene film may be superimposed to form a multiplicity of layers. The laminates may be built up in continuous lengths which can then be cut up into predetermined lengths and rolled up into conventional capacitor forms.

There are a plurality of basic procedures employed in practising the invention as shown diagrammatically in Fig. 1, each of which procedures will be described later. Initially as indicated in Fig. 1 the plastic film is formed by a casting procedure on a belt carrier. A metal layer may then be deposited on the film by a vacuum metallizing procedure as indicated by line 1. Alternatively the cast film may be removed from the belt carrier in the stripping step as indicated by line 1A. The stripped film may then be vacuum metallized as indicated by line 1B. After metallizing the film the metal layer may be increased in thickness by a spray metallizing procedure (line 2A) or alternatively by a continuous electroplating procedure (line 2B). After spray metallizing, vacuum metallizing, or electroplating the plastic film, another layer of plastic film may be cast over the metal layer as indicated by lines 3A, 3B, 3C. These procedures (1—3B, 1—2A—3A, 1—2B—3C) may be repeated a number of times so that by repeatedly casting plastic film and depositing a metal layer with or without a build-up in thickness by electroplating or spray metallizing, a laminate including multiplicity of film-metal layers may be produced. Any of the initial or succeeding metallizing and electroplating steps may be done with the film or laminate still mounted on the belt carrier, or with the film or laminate stripped from the belt. Thus the film or laminate can be carried through the stripping step after any one of the previous indicated procedures as shown by lines 1A, 4A, 4B and 4C. Line 4 is a flow line common to lines 4A, 4B and 4C.

In Fig. 2 is shown a preferred apparatus for casting plastic film according to the invention. In Fig. 2, a light gauge flexible, stainless steel belt or strip 10 of the order of several inches in width or more is carried by a roller 11 adjustably tensioned by appropriate friction means. The belt 10 is led down through buffing rollers 12, 13 into the container 14 which contains the aqueous dispersion of polytetrafluoroethylene particles 15. The consistency and solids content of the dispersion are fixed at predetermined values based on considerations to be described later. After passing around the idler roller 16, the belt emerges coated with wet layers 18, 19 into the drying oven 17 having a drying zone A. The drying area is maintained at a temperature between 60° C. and 150° C. by means of electrical elements 21 supplied with power from a suitable source via conductors 20. The drying oven may be an electrically heated warm air type as shown or may be a gas fired flue chamber, or a double bank of infrared lamps having its rays directed on the passing belt. From the drying zone A the belt continues its upward movement into the sintering zone B of the oven 22. The sintering oven is maintained at a temperature varying from about 290° C. at the entrance to the zone B to about 410° C. near the exit from the zone B by a series of electrical resistance elements 23 energized from a suitable power source via conductors 24. On emerging from oven 22, the belt 10 carries a pair of layers of film readily separable from the metal base. The belt and layers pass over idler roller 25 and the film layers are then taken up on their respective rollers 26, 27 while the belt is wound upon roller 11'. Roller 11' with the belt 10 fully wound thereon may then be used to replace the empty roller 11 at the initial feeding position preceding rollers 12, 13 for repeating the operating cycle. The roller 11' in the final take-up position is driven by a suitable drive mechanism 28, powered by a motor M which rotates roller 11' in the direction shown by arrow 29 to effect unwinding of the belt at the initial position, passage through container 14, oven areas A and B, and rewinding of the belt on roller 11'. The drive mechanism (D.M.) also is connected to rollers 26, 27 to effect take-up of film on the respective rollers as they rotate in the direction shown by arrows 30. Rollers 12, 13 are rotated by a drive mechanism 28' in a direction as shown by arrows 31 which opposes the direction of movement of belt 10 from roller 11 so that the rollers 12, 13 effectively buff the belt before its immersion in the container 14. It will be noted that surface of belt 10 throughout the buffing, dipping, drying, sintering and stripping operations remains free of acids, oxides and all other foreign materials which might react chemically with the metal and become occluded in the plastic film. Although stainless steel is a preferred material for the belt 10 satisfactory results will be obtained with belts made of nickel or nickel plated steel, or chromium finished metals having highly polished surfaces. In all cases the surfaces should have less than 250 micro inches of roughness. In no case should a material which oxidizes in air or water or which otherwise reacts with air or water or the usual impurities found therein be used for the belt employed in the present process and apparatus. If such a metal must be used it should be heavily plated preferably with nickel and chromium so that only substantially chemically inert surfaces are exposed to the aqueous dispersion of plastic material and the resulting films.

If desired for convenience in further processing the belt 10 with the film layers 18, 19 solidified thereon may be wound on roller 11' without stripping the film from the belt.

Other and further apparatus for casting film is disclosed in my co-pending application, Serial No. 413,024, filed March 1, 1954, of which this application is a continuation in part.

The polytetrafluoroethylene film is prepared by depositing the dispersion polymer containing particles less than 1 micron in diameter employing the apparatus of Fig. 2 or that disclosed in my co-pending application above mentioned over a smooth metal surface and sintering at or above the 327° C. transition temperature of the polymer, the dried deposition having a thickness not more than 0.0015 inch; such a combination of deposition and sintering mediums can be repeated several times to build up any desired thickness. Films as low as 0.00025 inch can be made which are particularly desirable for small capacitors for use in miniaturized equipment. Film layers prepared by deposition and sintering from aqueous dispersion are particularly desirable as the intermediate layers over the metallized surface because as I have discovered, they afford (a) greater adhesion over any construction made with pre-formed and built-up metal-film laminates and (b) consistently higher dielectric strength than any film made either by shaving from molded block or by compressing and sintering a powdered layer of the polymer. The greater degree of adhesion of the metallized surface to the polymer layer was a unique discovery as attempts hitherto to form a laminate of the polymer film with a thin preformed layer of a conductor capable of adhering on exposure to temperatures above 200° C. invariably showed marked separation of the two components under continued electrical stress. Thus metallized laminates showed consistently longer adhesion on continued exposure to 200° C. than the laminate of preformed metal foil and polytetrafluoroethylene film. It is presumed that this unexpected and marked difference is due to the manner in which the metallized particles, deposited from metal vapors, permeate the surface of the polytetrafluoroethylene film and thus affect a considerably higher metal film interface contact than that possible with preformed layers. By virtue of the unusually higher adherence of the metallized surface deposited over the polytetrafluoroethylene film, it has been possible to affect excellent soldering on the metallized side to a variety of terminals and flat metal surfaces in marked contrast to laminates of preformed metal-film layers which readily peel apart on application of heat approaching or exceeding that of 327° C. transition temperature of the polymer. Thus the metallized laminates also serve as an excellent means for attaching polytetrafluoroethylene films to various metal surfaces as shown in Fig. 12 to be described later.

Typical dielectric strengths, short time, of the various polymer films as determined by Method D1949-44 of the American Society of Testing Materials (A.S.T.M.) are listed in the following table:

*Dielectric strengths, short time, of various polytetrafluoroethylene films*

| Method of Preparation | Thickness, Mil (0.001 inch) | Dielectric Total, Volts | Strength [1] Volts/Mil |
| --- | --- | --- | --- |
| Casting from dispersion | 0.25 | 1,600 | 5,400 |
| Shaved Tape | (not feasible) | | |
| Molded Sheeting | (not feasible) | | |
| Casting from dispersion | 0.5 | 2,100 | 4,200 |
| Shaved Tape | (not feasible) | | |
| Molded Sheet | (not feasible) | | |
| Casting from dispersion | 1.0 | 3,600 | 3,600 |
| Shaved Tape | 1.0 | 1,600 | 1,600 |
| Molded Sheeting | (not feasible) | | |
| Casting from dispersion | 3.0 | 9,600 | 3,200 |
| Shaved Tape | 3.0 | 3,600 | 1,200 |
| Molded Sheeting | 3.0 | 5,400 | 1,600 |
| Casting from dispersion | 5.0 | 12,000 | 2,400 |
| Shaved Tape | 5.0 | 5,250 | 1,050 |
| Molded Sheeting | 5.0 | 6,300 | 1,060 |

[1] Average of ten readings.

Whereas thin films, i.e. less than 0.001 inch are not feasible to prepare by either shaving or sheet compression molding methods in continuous lengths for capacitor applications, it has been possible to prepare films by casting from dispersion in the order of 0.00025 inch with outstandingly high dielectric strengths as indicated in the above table. In fact, the total dielectric strength of the 0.00025 inch thick cast film is comparable to that of the 0.001 inch thick shaved film, indicating a four-fold efficiency of the cast film. With this four-to-one thickness advantage at equivalent dielectric strength it is apparent that the cast film combined with a metallized surface affords considerable reductions in capacitor size for given capacitance, a feature that is particularly important in miniaturized electronic devices. Comparison of the dielectric strength values at other thicknesses indicate consistently higher strengths with the films made by casting and sintering from aqueous dispersions.

Capacitors constructed of the laminates made of metalized, dispersion-cast polytetrafluoroethylene films require no oil impregnation to supplant voids such as are apt to exist and form during actual service from corona degradation of other dielectrics as is often the case with conventional capacitors. The use of polytetrafluoroethylene as a dielectric furnishes a capacitor that permits temperature surges up to 300° C. and higher. Furthermore, the capacitance is consistent regardless of operating temperature and frequencies. Service life of capacitors constructed of metallized aluminum laminates with 0.25 mil thick cast film have shown as much as 5 to 20 fold longer endurance than any hitherto constructed of equivalent thicknesses of other dielectrics.

In Figs. 3 and 4 are shown an arrangement for depositing a conductive metallized layer on the plastic film. The chamber 40 contains rotatable rollers 41, 42. Roller 42 is driven by a suitable motor and driving means. A roll R of laminate consisting of the belt 10 and film layers 18, 19 as obtained from apparatus such as shown in Fig. 2 is carried by roller 41. The laminate is passed under a backing plate 43 where a layer of metal such as gold, silver, aluminum, copper, zinc or equivalent metal is deposited on the exposed side of the film. The metal 44 may be carried by a crucible 45 with flaring sides. If the metal is to be deposited in continuous or discontinuous strips a mask or grate 46 consisting of a plurality of bars aligned parallel to the backing plate is disposed between the crucible and laminate. The evaporated metal travels in substantially straight lines 47 so that the metal layer 48 is deposited in continuous strips or stripes on the film layer 18. The laminate is rolled up on roller 42, and the roll R' including the newly deposited layer 48 may then be removed to be processed further. The high vacuum metallizing technique employed in the apparatus of Fig. 3 requires a vacuum of 0.5 micron Hg or less (0.0005 mm. absolute pressure) in order to provide a mean free path of residual gases great enough to allow vaporized metal particles to reach the target, in this case the polytetrafluoroethylene film, without collision and subsequent diversion. For proper metal coating of uniform quality, it is essential that the metal source expel metal vapors at a uniform rate. This is accomplished by the use of a resistance type heater which may be a strip of tungsten, molybdenum or the graphite crucible 45 into which is fed at a constant speed the metal to be vaporized. In the metallizing of unsupported film, polytetrafluoroethylene film may be used which has been stripped from its metal belt carrier 10. The backing plate 43 will support the thin film 18 against the impinging metal from source 44 as shown in Fig. 4A. By the proper use of the masking bars 46 uncoated margins may be left upon the surface of the film which may later serve as insulating margins in the fabrication of capacitors.

After one side of the film on the belt 10 is coated with metal, the film on the other side of the belt may be similarly coated by re-running the roll R' back onto roller 41 but with the belt reversed to expose the other side of the plastic coated belt to the metallic vapor.

In an alternate arrangement of the apparatus of Fig. 3 the belt 10 can be caused to move past two crucibles 45, disposed at opposite sides of the belt.

It is possible to sectionalize the metal conducting layer by placing a thin masking tape or protective masking bars across either the width or the length of the plastic film at selected regions just prior to the metallizing step so that the metal does not impinge on the plastic layer protected by the masking medium. After the metallizing step is completed, the masking medium is removed. The film may then be recoated by application of another layer of the plastic film by using the apparatus of Fig. 2. A second sectionalized coating of metal may then be applied by means of the apparatus of Fig. 3, and the coated film may then be stripped from the belt carrier. This technique is adapted to production of printed circuit elements of many types for use in electronic apparatus employing printed circuits.

In cases where absolute precision is required in depositing a metal coating on the plastic film, a sputtering technique can be used in the high vacuum chamber 40. The metal will be deposited by means of positive ion bombardment. By controlling the applied voltage between anode and cathode, a layer of metal of precisely controlled proportions may be applied to the film.

After metal coatings are applied by the vacuum metallizing apparatus, the thickness of the coatings can be built up by a spraying procedure using the apparatus of Fig. 5. The spray guns are disposed at opposite sides of belt 10 which is carried past the nozzles 51 while a spray 52 of metal in powder form is forced through an oxyacetylene flame which makes the powder semi-molten. The particles of metal flatten and interlock as they strike the surfaces of metal layers 48 increasing their thickness as shown in Fig. 5.

Another apparatus for increasing the thickness of the coatings initially applied by the vacuum metallizing procedure is shown in Fig. 6. This apparatus employs an electrodeposition procedure. When the thickness of the coating is increased its conductivity correspondingly increases. This is desirable in capacitor structures where excessively thin metal coatings cause internal electrical stresses due to their high resistivity. In Fig. 6 is shown a tank 60 containing a suitable electrolyte 61. Anode 58 is suspended in the electrolyte and is connected to the positive terminal of a suitable direct current source. Cathodes 57 have the form of conductive rollers connected together to the negative terminal of the direct current source. The roll of laminate R' includes belt 10, plastic film layers 18, 19 and metal coatings 48 as obtained from the apparatus of Fig. 3. The laminate is immersed in the electrolyte 61 under rollers 58, 62. Drive roller 56 suitably powered draws the laminate from roll R' which is carried by roller 55. As the laminate passes through the electrolyte, the anode goes into solution while metal is deposited on the coatings 48 which are electrically in contact with cathodes 57.

In Fig. 7 is shown the laminate formed by casting the plastic film 18, vacuum metallizing to deposit coating 48, and then stripping the laminate from the carrier belt. This sequence of operations would be that included by lines 1, 4B, 4 of Fig. 1. If the thickness of film were built up by spraying or electrode position, the sequence would be 1, 2A (or 2B), 4A (or 4C), 4.

In Fig. 8, the laminate includes film 18 and the metal coating 48 in the form of stripes or bars. The same procedure as indicated for Fig. 7 would be used to produce this laminate and the apparatus of Figs. 1 and 3 would be employed.

In Fig. 9 the laminate consists of two plastic film layers 18 with a metal layer 48 in between. This laminate is produced by casting the plastic film, vacuum deposition of a metal layer, casting a second plastic film layer on the metal coating and then stripping the laminate from the carrier belt. This laminate would be produced by the sequence 1, 3B, 1A in accordance with Fig. 1.

In Fig. 10 the laminate has two plastic film layers 18 and two metal coatings produced by a succession of plastic film casting and vacuum deposition of metal procedures. This sequence may be represented as 1, 3B, 1, 3B, 1A according to Fig. 1.

In Fig. 11, the laminate consists of three layers of plastic film 18 and two layers of metal 48. Each metal layer is discontinuous in form. The discontinuance is produced by suitable masking during deposition of the metal layers. In this laminate and in all the preceding laminates discussed above, the metal layers can be increased in thickness by spraying or electrolytic deposition procedures. The sequence of procedures for producing this laminate would then be 1, 2A (or 2B), 3A (or 3C), 1, 2A (or 2B), 3A or 3C, 1A according to Fig. 1. The laminate shown in Fig. 4 is particularly valuable in fabricating capacitors, especially those of miniature type, by adjusting the lengths and widths of the discontinuous deposits of metallic conductor. These laminates can be folded, rolled, or piled as desired to form a great variety of capacitors.

In Fig. 12 the laminate consisting of plastic film layer 18 and metal coating 48 is attached to a sheet 66 of metal such as copper. The coating 48 preferably consists of silver which is readily attached to the copper sheet by solder layer 65. The invention thus provides a convenient means of covering a metal plate or sheet with a plastic film.

In their preferred form the laminates produced according to the invention include one or more layers of polytetrahaloethylene. Insofar as the laminates are used in miniature capacitor constructions, the plastic film may include polychlorotrifluoroethylene and copolymers of tetrafluoroethylene with ethylene and other fluorinated alkines.

In the laminate structure shown in Fig. 10, the layer 18 of polytetrafluoroethylene located between the metal layers 48 serves as a dielectric. The outer film layer 18 can be formed of some other plastic film, such as polyethylene, polystyrene, polyethylene terephthalate, plasticized polyvinyl chloride, polyvinyl alcohol, polyvinyl acetate, plasticized cellulose acetate and butyrate, polyhexamethylene adipamide, polyomegaaminocaprolactam, and similar polymeric films which do not have the thermal stability on continued or indefinite exposure to elevated temperatures. Moreover, the film serving as the high-temperature dielectric laminate member can be extended by interspersing with inert fillers such as finely-divided mica, quartz, silica, talc, clay, glass, calcium fluoride, asbestos, titanium dioxide, alkaline earth titanites, and/or mineral fillers thermally stable to the sintering temperatures of the polytetrafluoroethylene film. Such low loss fillers as mica, quartz, and silica are highly useful in imparting rigidity to the laminate structure, while others such as titanium dioxide afford a means for adjusting the electrical properties especially for increasing the dielectric constant of the film layer. The fillers are conveniently incorporated in the polytetrafluoroethylene film in the form of aqueous codispersions in amounts up to 50 percent by weight without adversely affecting the flexibility needed for the procedures indicated in Figures 2, 3, 5 and 6. Similarly, the finely-divided fillers can be interspersed in dispersions of other polytetrafluoroethylene, such as polychlorotrifluoroethylene and copolymers of tetrafluoroethylene, in such non-aqueous media as toluene. Ordinarily, the optimum codispersions for continuous film formation are with filler particle sizes that are no larger than 0.5 micron.

To fabricate the desired capacitor, the laminate structure can be assembled by any of the conventional methods such as spiralling over a metal spindle or collapsible core, by repeated folding into built-up superimposed layers or by piling up sectionalized laminates cut in appropriate dimensions. Terminal connections can be easily accomplished by making a clean narrow edge-cut to which metal is applied by spray coating and in turn connected to suitable leads. The final assembly of the capacitor can then be covered with appropriate encapsulating devices to furnish necessary insulation or protection against moisture or air.

Although the invention has been described in considerable detail, these have been by way of explanation rather than limitation. Many modifications are possible without departing from the spirit of the invention. The invention is to be construed as limited only by the scope of the appended claims.

I claim:

1. A method of making a composite laminate structure, comprising the steps of casting and sintering a thin dielectric film of polytetrahaloethylene, applying a thin metal coating to one surface of said dielectric film by vacuum evaporation, and then casting and sintering a second thin dielectric film of polytetrahaloethylene upon the coated surface of the first dielectric film, each casting and sintering being done independently of the other and each casting being controlled so as to provide the resulting films with predetermined thickness, each film independently of the other.

2. A method in accordance with claim 1, wherein only a part of the first mentioned surface is coated with said thin metal coating, the remaining part of said first mentioned surface being left bare of said metal coating, said second dielectric film being cast both upon the coated and uncoated parts of said first mentioned surface.

3. A method in accordance with claim 1, wherein the first dielectric film is cast in a continuous strip, the metal coating being applied continuously to said first dielectric film by continuously exposing said first dielectric film to metal evaporation, said second dielectric film being also cast in a continuous strip upon said coated surface of the first dielectric film.

References Cited in the file of this patent

UNITED STATES PATENTS 2,104,018    Brennan    Jan. 4, 1938
2,427,183    Berry    Sept. 9, 1947

(Other references on following page)

UNITED STATES PATENTS

| | | |
|---|---|---|
| 2,478,229 | Berry | Aug. 9, 1949 |
| 2,520,173 | Sanders | Aug. 29, 1950 |
| 2,587,568 | Eisler | Feb. 26, 1952 |
| 2,619,443 | Robinson | Nov. 25, 1952 |
| 2,665,224 | Clough et al. | Jan. 5, 1954 |
| 2,668,134 | Horton | Feb. 2, 1954 |
| 2,689,805 | Croze et al. | Sept. 21, 1954 |
| 2,706,697 | Eisler | Apr. 19, 1955 |
| 2,707,693 | Dorst | May 3, 1955 |
| 2,740,732 | Peck et al. | Apr. 3, 1956 |

FOREIGN PATENTS

| | | |
|---|---|---|
| 694,995 | Great Britain | July 29, 1953 |

OTHER REFERENCES

Printed Circuits, U.S. Dept. Commerce Bulletin 192, 1948, pages 1 to 4 and 37.